United States Patent
Chikira et al.

(10) Patent No.: US 8,422,386 B2
(45) Date of Patent: Apr. 16, 2013

(54) ABNORMAL TRAFFIC DETECTION APPARATUS, ABNORMAL TRAFFIC DETECTION METHOD AND ABNORMAL TRAFFIC DETECTION PROGRAM

(75) Inventors: Kazuaki Chikira, Tokyo (JP); Hideo Mori, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 290 days.

(21) Appl. No.: 12/679,029

(22) PCT Filed: Sep. 25, 2008

(86) PCT No.: PCT/JP2008/067317
§ 371 (c)(1),
(2), (4) Date: Mar. 19, 2010

(87) PCT Pub. No.: WO2009/044660
PCT Pub. Date: Apr. 9, 2009

(65) Prior Publication Data
US 2010/0220619 A1    Sep. 2, 2010

(30) Foreign Application Priority Data

Oct. 2, 2007 (JP) ................................ 2007-258798

(51) Int. Cl.
| G01R 31/08 | (2006.01) |
| G06F 11/00 | (2006.01) |
| G08C 15/00 | (2006.01) |
| H04J 1/16 | (2006.01) |
| H04J 3/14 | (2006.01) |
| H04L 1/00 | (2006.01) |
| H04L 12/26 | (2006.01) |
| H04L 12/28 | (2006.01) |
| H04L 12/56 | (2006.01) |

(52) U.S. Cl.
USPC .......................................... 370/252; 370/389

(58) Field of Classification Search .................... None
See application file for complete search history.

(56) References Cited

U.S. PATENT DOCUMENTS 6,298,123 B1 * 10/2001 Nolting et al. ................ 379/111
2005/0152399 A1 * 7/2005 Chu et al. ...................... 370/469
(Continued)

FOREIGN PATENT DOCUMENTS

| CN | 1953392 A | 4/2007 |
| CN | 101026505 A | 8/2007 |

(Continued)

OTHER PUBLICATIONS

The Extended European Search Report issued Jun. 20, 2011, in Application No. / Patent No. 08834894.1-1244 / 2187577 PCT/JP2008067317.

(Continued)

Primary Examiner — Xavier Szewai Wong
(74) Attorney, Agent, or Firm — Oblon, Spivak, McClelland, Maier & Neustadt, L.L.P.

(57) ABSTRACT

An abnormal traffic detection apparatus for detecting an abnormal traffic toward a communication apparatus by using information on traffics passing through a switch, comprising destination IP address counting units (C1 to C4) configured to store amount information on amount of traffics as an amount information table corresponding to each communication apparatus, a traffic separating unit (21) for registering amount information on a new destination IP address in the amount information table corresponding to the destination IP address, each time a traffics having the new destination IP address passes through the switch, and storing the amount information in the amount information table corresponding to each communication apparatus, and abnormal traffic judging units (J1 to J4) for detecting an abnormality of the traffic amount flowing through the switch on the basis of the amount information stored in the amount information table.

10 Claims, 10 Drawing Sheets

U.S. PATENT DOCUMENTS

2005/0198519 A1    9/2005   Tamura et al.
2007/0115850 A1    5/2007   Tsuchiya et al.
2008/0159165 A1    7/2008   Takara

FOREIGN PATENT DOCUMENTS

| | | |
|---|---|---|
| CN | 101803312(A) | 8/2010 |
| JP | 2003 283548 | 10/2003 |
| JP | 2004 356906 | 12/2004 |
| JP | 2005 57408 | 3/2005 |
| JP | 2007 116405 | 5/2007 |
| JP | 2008 35266 | 2/2008 |
| JP | 2008 258996 | 10/2008 |

OTHER PUBLICATIONS

Christian Estan, et al., "New Directions in Traffic Measurement and Accounting", Computer Communication Review, vol. 32, No. 4, XP001162294, Oct. 1, 2002, ISSN: 0146-4833, pp. 323-336.

Phil Kwan, "Enhancing Security with SFlow Tecnology", Foundry Networks White Paper, XP002637755, May 2003, Retrieved from the Internet: URL:http://downloads. lightreading.com/wplib/foundry/Fdry_Security_sFlow.pdf [retrieved on May 18, 2001], pp. 1-15.

Phaal, P. et al., "InMon Corporation's sFlow: A Method for Monitoring Traffic in Switched and Routed Networks", Network Working Group, Request for Comments: 3176, Category: Informational, 28 Pages, (Sep. 2001).

Claise, B. "Cisco Systems NetFlow Services Export Version 9", Network Working Group, Request for Comments:3954, Category: Informational, 30 Pages, (Oct. 2004).

Office Action issued in corresponding Chinese Patent Application No. 200880107902.9, dated Jul. 5, 2012.

\* cited by examiner

FIG.5

| SAMPLE NUMBER | DESTINATION MAC ADDRESS | DESTINATION VLAN | DESTINATION IP ADDRESS | SIZE |
|---|---|---|---|---|
| 1 | 0000.0000.0001 | 1 | 192.168.1.1 | 100 |
| 2 | 0000.0000.0002 | 1 | 192.168.2.1 | 100 |
| 3 | 0000.0000.0003 | 2 | 192.168.3.1 | 100 |
| 4 | 0000.0000.0002 | 1 | 192.168.2.2 | 100 |
| 5 | 0000.0000.0003 | 1 | 192.168.3.2 | 100 |
| 6 | 0000.0000.0003 | 1 | 192.168.3.2 | 100 |

FIG.6

| ISP | DESTINATION MAC ADDRESS | DESTINATION VLAN |
|---|---|---|
| 1 | 0000.0000.0001 | 1 |
| 2 | 0000.0000.0002 | 1 |
| 3 | 0000.0000.0003 | 1 |
| 4 | 0000.0000.0003 | 2 |

FIG.7

DESTINATION IP ADDRESS COUNTING UNIT C1 (101)

| DESTINATION IP ADDRESS | COUNTER (SIZE) | TOTAL COUNTER (TOTAL SIZE) |
|---|---|---|
| 192.168.1.1 | 1 (100) | 1 (100) |

FIG.8

DESTINATION IP ADDRESS COUNTING UNIT C2 (102)

| DESTINATION IP ADDRESS | COUNTER (SIZE) | TOTAL COUNTER (TOTAL SIZE) |
|---|---|---|
| 192.168.2.1 | 1 (100) | 2 (200) |
| 192.168.2.2 | 1 (100) | |

FIG.9

| DESTINATION IP ADDRESS COUNTING UNIT C3 | | | 103 |
|---|---|---|---|
| DESTINATION IP ADDRESS | COUNTER (SIZE) | TOTAL COUNTER (TOTAL SIZE) | |
| 192.168.3.2 | 2 (200) | 2 (200) | |

FIG.10

| DESTINATION IP ADDRESS COUNTING UNIT C4 | | | 104 |
|---|---|---|---|
| DESTINATION IP ADDRESS | COUNTER (SIZE) | TOTAL COUNTER (TOTAL SIZE) | |
| 192.168.3.1 | 1 (100) | 1 (100) | |

| ABNORMAL TRAFFIC JUDGING UNIT J1 ||
|---|---|
| COUNTER THRESHOLD VALUE (SIZE THRESHOLD VALUE) | TOTAL COUNTER THRESHOLD VALUE (TOTAL SIZE THRESHOLD VALUE) |
| 2 (200) | 2 (200) |

FIG.13

| ABNORMAL TRAFFIC JUDGING UNIT J2 ||
|---|---|
| COUNTER THRESHOLD VALUE (SIZE THRESHOLD VALUE) | TOTAL COUNTER THRESHOLD VALUE (TOTAL SIZE THRESHOLD VALUE) |
| 2 (200) | 2 (200) |

FIG.14

| ABNORMAL TRAFFIC JUDGING UNIT J3 ||
|---|---|
| COUNTER THRESHOLD VALUE (SIZE THRESHOLD VALUE) | TOTAL COUNTER THRESHOLD VALUE (TOTAL SIZE THRESHOLD VALUE) |
| 2 (200) | 10 (800) |

| ABNORMAL TRAFFIC JUDGING UNIT J4 ||
|---|---|
| COUNTER THRESHOLD VALUE (SIZE THRESHOLD VALUE) | TOTAL COUNTER THRESHOLD VALUE (TOTAL SIZE THRESHOLD VALUE) |
| 5 (500) | 5 (500) |

ABNORMAL TRAFFIC DETECTION APPARATUS, ABNORMAL TRAFFIC DETECTION METHOD AND ABNORMAL TRAFFIC DETECTION PROGRAM

TECHNICAL FIELD

The present invention relates to an abnormal traffic detection apparatus, an abnormal traffic detection method and an abnormal traffic detection program for detecting an abnormal traffic at an IX (Internet Exchange).

BACKGROUND ART

In recent years, ISPs (Internet Service Provider) have been interconnected with each other through an IX (interconnection point) for enabling communication between the ISPs over the Internet. In the network using such an IX, there is a problem of DDoS (Distributed Denial of Service) attack, in which a large amount of packets are transmitted to the ISPs to increase a load of the ISPs, thereby hindering ISP services. An IDS (Intrusion Detection System) is an example of an intrusion detection system for monitoring unauthorized intrusion or attack against the Internet or in-company network. The IDS monitors and analyzes packets flowing over the network and refers to a database of attack methods called signature (signature database) to automatically detect unauthorized intrusion or attack. The signature is a database that stores therein characteristics of data contained in a header and a payload of a traffic as a pattern of a known unauthorized access, and the information within the database is updated each time a new attack method is found.

The large amount of traffics is one characteristic of the DDoS attack. Thus, the IX enters a high-load state if a confirmation is made as to whether each traffic and a signature match each other for all the traffics reaching the IX.

A conventional DDoS attack detection system has detected a DDoS attack not by monitoring signatures but by monitoring the amount of traffics. In monitoring the amount of traffics, a value obtained by summing the amounts of traffics for each protocol or for each destination IP (Internet Protocol) address is also monitored while the total amount of traffics is monitored. The DDoS attack detection system needs only the amount of traffics, and all the contents of the entire traffics flowing over the network do not need to be monitored. Therefore, by receiving only traffic statistics information from a switch or router forming the network to be monitored, the amount of traffics can be efficiently monitored. A commercially available switch or router employs sFlow or netflow as a traffic statistics information output form (refer to Non-patent Documents 1 and 2).

The DDoS attack that disables a server has the characteristic in which traffics toward a target server rapidly increase. Thus, it is effective to identify a destination IP address for detecting an abnormal traffic. For example, a packet processing method described in Patent Document 1 observes the amount of traffics for each previously-registered destination IP address.

Non-patent Document 1: Network Working Group Request for Comments: 3176 Category: Informational "InMon Corporation's sFlow: A Method for Monitoring Traffic in Switched and Routed Networks" [online] P. Phaal, S. Panchen, N. McKee, InMon Corp. September 2001 [searched on Sep. 4, 2007], Internet <URL: http://www.ietf.org/rfc/rfc3176.txt>

Non-patent Document 2: Network Working Group Request for comments: 3954 Category: Informational "Cisco Systems NetFlow Services Export Version 9" [online] B. Claise, Ed. Cisco Systems October 2004 [searched on September 4, 2007], Internet <URL: http://www/ietf.org/rfc/rfc3594.txt>

Patent Document 1: Japanese Patent Application Laid-Open No. 2003-283548

DISCLOSURE OF INVENTION

Problem to be Solved by the Invention

In the above-described first to third conventional techniques, when a traffic observation point is at an entry of an in-company network or data center, destination IP addresses to be monitored can be previously registered because the destination IP addresses are limited.

However, when the above-described first to third conventional techniques are applied to monitor the traffics for detecting a DDoS attack at an IX, the following problems occur. Since destination IP addresses included in traffics that pass through the IX are unlimited, the destination IP addresses cannot be previously registered. Thus, there is a problem in that the amount of traffics cannot be observed at the IX on the basis of the previously-registered destination addresses.

Further, there is a problem in that, when a certain memory area is saved and a newly appearing destination IP address is registered as an index each time the new destination IP address appears, the kinds of index increase and the calculation amount for counting the traffics increases along with the increase in the kinds of index.

Even when the destination IP addresses are identified, the IX cannot block the traffics toward the destination IP addresses. Therefore, when an abnormal traffic due to the DDoS attack is detected, it is necessary to notify the ISP, through which the traffics making the DDoS attack first pass, of the fact that an abnormal traffic has been detected. Thus, it is necessary not only to identify the destination IP address but also to identify the ISP which is to be notified of an occurrence of the abnormal traffic.

The present invention has been made in view of such circumstances described above, and an object of the present invention is to provide an abnormal traffic detection apparatus, an abnormal traffic detection method, and an abnormal traffic detection program, which efficiently and rapidly detect an abnormal traffic without previously registering destination IP addresses of traffics that pass through a switch.

Means for Solving Problem

To solve the problem described above and achieve the object, the invention according to a first aspect is an abnormal traffic detection apparatus that, when traffics are transmitted and received between communication apparatuses connected to the Internet via a switch, monitors traffics passing through the switch and uses traffic information on the monitored traffics to detect abnormal traffics toward the communication apparatus, comprising: an amount information storing unit configured to store amount information on an amount of traffics as an amount information table, the amount information table corresponding to each communication apparatus that is a destination of the traffics, the amount information being included in the traffic information; a storage controlling unit configured to identify a router, which connects the communication apparatus as the destination of the traffics and the switch, and a destination IP address of the traffics on the basis of the traffic information, the storage controlling unit configured to register, when the identified destination IP address is a new destination IP address not stored in the amount information table, the new destination IP address in the amount information table and then store the amount information in the amount information table, which corresponds to the identified communication apparatus, the storage controlling unit configured to store, when the identified destination IP address is a destination IP address already stored in the amount information table, the amount information in the amount information table, which corresponds to the identified communication apparatus; and an abnormal traffic judging unit that judges, for each of the communication apparatuses or each of the routers, whether the traffic amount flowing through the switch is abnormal on the basis of the amount information stored in the amount information table.

In the invention described above, according to a second aspect, the storage controlling unit is configured to identify the communication apparatus as the destination of the traffics on the basis of a destination MAC address and a destination VLAN, both of which are included in the traffic information, and previously-stored information on a communication apparatus corresponding to the destination MAC address and the destination VLAN.

In the invention described above, according to a third aspect, the judging unit is configured to store threshold values, which are used in judging whether the traffic amount is abnormal, for the respective amount information tables, and is configured to compare, for each of the amount information tables, the amount information stored in the amount information table and the threshold value corresponding to the amount information in order to judge whether the traffic amount flowing through the switch is abnormal.

The invention according to a fourth aspect is an abnormal traffic detection method that, when traffics are transmitted and received between communication apparatuses connected to the Internet via a switch, monitors traffics passing through the switch and uses traffic information on the monitored traffics to detect abnormal traffics toward the communication apparatuses, comprising: a traffic information acquiring step of acquiring the traffic information; a destination identifying step of identifying a router, which connects the communication apparatus as a destination of the traffics and the switch, and a destination IP address of the traffics on the basis of the traffic information; an amount information storing step of storing amount information on an amount of traffics included in the traffic information as an amount information table corresponding to each communication apparatus that is a destination of the traffics, in which when the identified destination IP address is a new destination IP address not stored in the amount information table, the new destination IP address is registered in the amount information table and then the amount information is stored in the amount information table, which corresponds to the identified communication apparatus, and when the identified destination IP address is a destination IP address already stored in the amount information table, the amount information is stored in the amount information table, which corresponds to the identified communication apparatus; and an abnormal traffic judging step of judging, for each of the communication apparatuses or each of the routers, whether the traffic amount flowing through the switch is abnormal on the basis of the amount information stored in the amount information table.

In the invention described above, according to a fifth aspect, the amount information storing step includes identifying the communication apparatus as the destination of the traffics on the basis of a destination MAC address and a destination VLAN, both of which are included in the traffic information, and previously-stored information on a communication apparatus corresponding to the destination MAC address and the destination VLAN.

In the invention described above, according to a sixth aspect, the abnormal traffic judging step includes storing threshold values, which are used in judging whether the traffic amount is abnormal, for the respective amount information tables, and comparing, for each of the amount information tables, the amount information stored in the amount information table and the threshold value corresponding to the amount information in order to judge whether the traffic amount flowing through the switch is abnormal.

The invention according to a seventh aspect is an abnormal traffic detection program that uses traffic information on traffics, which are monitored when transmitted and received passing through a switch between communication apparatuses connected to the Internet via the switch, to cause a computer to detect abnormal traffics toward the communication apparatuses, comprising: a traffic information acquiring step of acquiring the traffic information; a destination identifying step of identifying a router, which connects the communication apparatus as a destination of the traffics and the switch, and a destination IP address of the traffics on the basis of the traffic information; an amount information storing step of storing amount information on an amount of traffics included in the traffic information as an amount information table corresponding to each communication apparatus that is a destination of the traffics, in which when the identified destination IP address is a new destination IP address not stored in the amount information table, the new destination IP address is registered in the amount information table and then the amount information is stored in the amount information table, which corresponds to the identified communication apparatus, and when the identified destination IP address is a destination IP address already stored in the amount information table, the amount information is stored in the amount information table, which corresponds to the identified communication apparatus; and an abnormal traffic judging step of judging, for each of the communication apparatuses or each routers, whether the traffic amount flowing through the switch is abnormal on the basis of the amount information stored in the amount information table.

In the invention described above, according to an eighth aspect, the amount information storing step includes identifying the communication apparatus as the destination of the traffics on the basis of a destination MAC address and a destination VLAN, both of which are included in the traffic information, and previously-stored information on a communication apparatus corresponding to the destination MAC address and the destination VLAN.

In the invention described above, according to a ninth aspect, the abnormal traffic judging step includes storing threshold values, which are used in judging whether the traffic amount is abnormal, for the respective amount information tables, and comparing, for each of the amount information tables, the amount information stored in the amount information table and the threshold value corresponding to the amount information in order to judge whether the traffic amount flowing through the switch is abnormal.

Effect of the Invention

In the invention according to the first, the fourth, or the seventh aspect, the information on the amount of traffics is stored in the amount information table corresponding to each communication apparatus, which is the traffic destination. Thus, each amount information can be stored in the amount information table having a small memory size, and an abnormal traffic can be detected efficiently and rapidly.

In the invention according to the second, the fifth, or the eighth aspect, the information on the communication apparatus corresponding to the destination MAC address and the destination VLAN is previously stored. Thus, the communication apparatus as the traffic destination can be easily identified.

In the invention according to the third, sixth, or the ninth aspect, the threshold value of the amount information used for judging whether the traffic amount is abnormal is stored for each of the corresponding amount information tables. Thus, a judgment can be easily made as to whether the amount of traffics flowing through the switch is abnormal by each amount information table.

BRIEF DESCRIPTION OF DRAWINGS

FIG. 5 is a diagram illustrating one example of an sFlow packet transmitted from a layer 2 switch;

FIG. 6 is a diagram illustrating a structure of IX management information;

FIG. 7 is a diagram illustrating a structure of a counter table (1);

FIG. 8 is a diagram illustrating a structure of a counter table (2);

FIG. 9 is a diagram illustrating a structure of a counter table (3);

FIG. 10 is a diagram illustrating a structure of a counter table (4);

FIG. 13 is a diagram illustrating a structure of threshold value information (2);

FIG. 14 is a diagram illustrating a structure of threshold value information (3);

Figure 1:
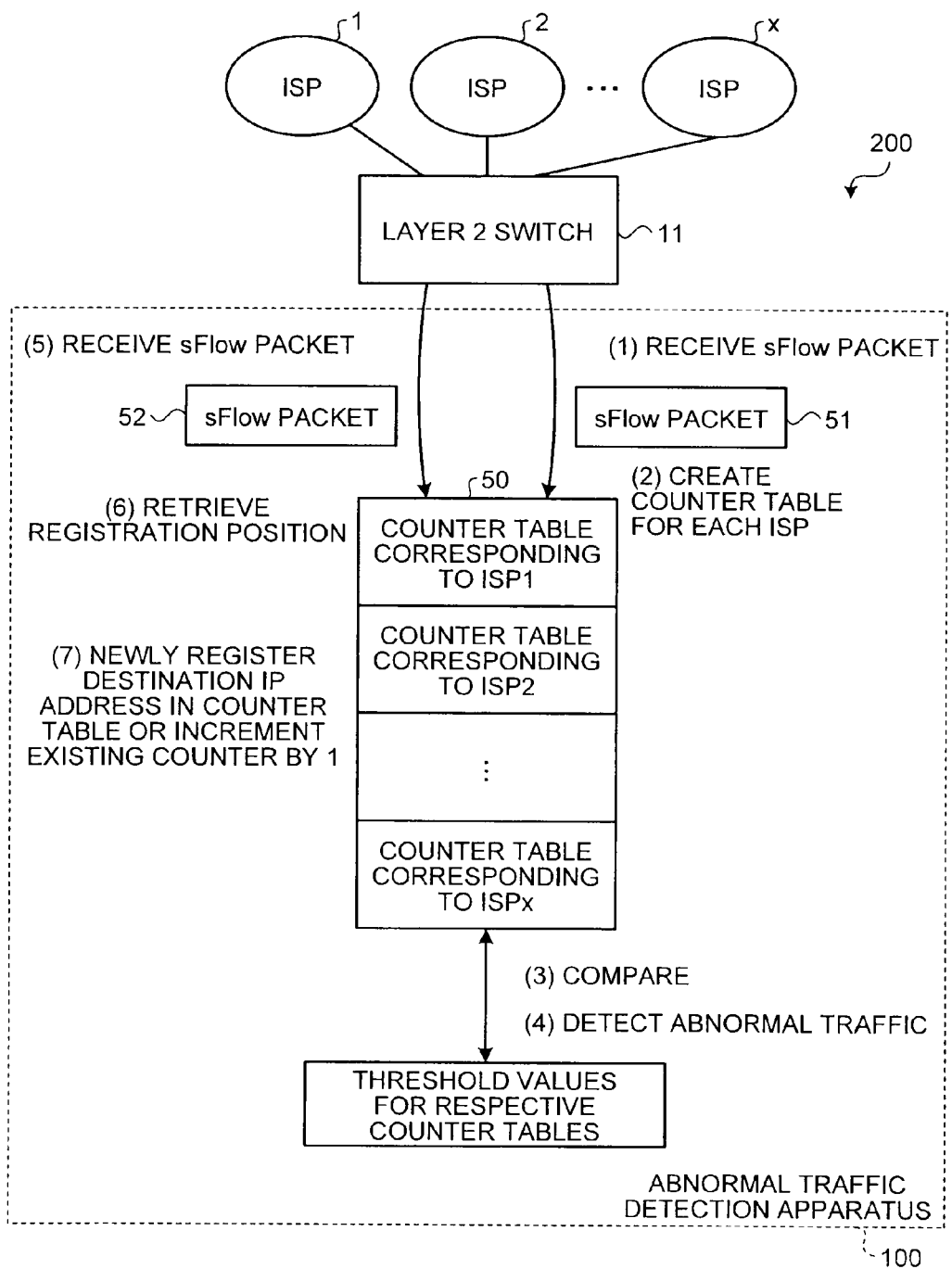
FIG. 1 is an explanatory diagram explaining the concept of abnormal traffic detection according to a first embodiment.

EXPLANATIONS OF LETTERS OR NUMERALS 1 to 4 ISP
11 Layer 2 switch
20 Abnormal traffic analyzing unit
21 Traffic separating unit
30 Traffic information transmitting unit
51, 52 sFlow packet
100 Abnormal traffic detection apparatus
101 to 104 Counter table
200 Abnormal traffic detection system
C1 to C4 Address counting unit
J1 to J4 Abnormal traffic judging unit

BEST MODE(S) FOR CARRYING OUT THE INVENTION

In the following sections, exemplary embodiments of an abnormal traffic detection apparatus, an abnormal traffic detection method, and an abnormal traffic detection program according to the present invention will be described in detail with reference to the accompanying drawings. The invention is not limited to these exemplary embodiments.

First Embodiment

The concept of the abnormal traffic detection according to the present embodiment will be described at first. FIG. 1 is an explanatory diagram explaining the concept of the abnormal traffic detection according to the first embodiment. An abnormal traffic detection system 200 is a system that monitors packets being transmitted and received between ISPs and detects an abnormal traffic (such as abnormal traffic due to the DDoS attack) at the IX (server or network).

In the abnormal traffic detection system 200, a layer 2 switch 11 performs a relay process on the packets being transmitted and received between the ISPs 1 to x (X is a natural number). An abnormal traffic detection apparatus 100, which performs an abnormal traffic detection process, monitors traffics passing through the layer 2 switch 11 when the traffics are transmitted and received between the ISPs 1 to x that are connected to the Internet via the layer 2 switch 11. The abnormal traffic detection apparatus 100 uses information (traffic information) on the monitored traffics to detect an abnormal traffic toward the ISPs 1 to x.

Specifically, the abnormal traffic detection apparatus 100 acquires (receives) an sFlow packet 51 as the information on the traffics flowing through the layer 2 switch 11 (1). Then, the abnormal traffic detection apparatus 100 uses a destination MAC address and VLAN information contained in the received sFlow packet 51 to count the traffics in each corresponding ISP through which the traffics are to be routed. At this time, the abnormal traffic detection apparatus 100 creates counter tables (amount information tables for counting information on the amount of traffics) 50 corresponding to the ISPs 1 to x and counts the traffics per destination IP address in each of the counter tables (2).

The abnormal traffic detection apparatus 100 compares the information on the amount of traffics stored in the counter tables (the number of packets or packet size) (amount information) with traffic threshold values that are set for the respective counter tables (3) to detect an abnormal traffic (4).

When new packets are transmitted and received between the ISP1 to ISPx, the abnormal traffic detection apparatus 100 acquires an sFlow packet 52 as a new sFlow packet (5). The abnormal traffic detection apparatus 100 identifies the counter table corresponding to the sFlow packet 52 and retrieves the destination IP address (retrieves a registration position) corresponding to the sFlow packet 52 from the identified counter table (6).

Then, when the destination IP address corresponding to the sFlow packet 52 is retrieved, the abnormal traffic detection apparatus 100 counts (adds) the traffics by incrementing the existing counter by 1. When the destination IP address corresponding to the sFlow packet 52 is not retrieved, the abnormal traffic detection apparatus 100 newly registers the destination IP address corresponding to the sFlow packet 52 in the counter table corresponding to the sFlow packet 52 and counts the traffics (7).

As described above, the count values of traffics are stored in the counter tables corresponding to each of the ISPs. Thus, one memory area for storing the count values of the traffics therein is smaller than a memory area for collectively storing the count values of all the traffics in one counter table. For example, when the size of the memory area for storing count values of traffics therein (counter table corresponding to one of the ISPs) is N, the size of the memory area for collectively storing the count values of all the traffics is xN.

In this embodiment, since the count values of traffics are stored in the counter tables each corresponding to one of the ISPs, the destination IP address can be rapidly retrieved when a judgment is made as to whether each traffic is registered in the counter table. Thus, an abnormal traffic occurring in the IX can be efficiently and rapidly detected.

Figure 2:
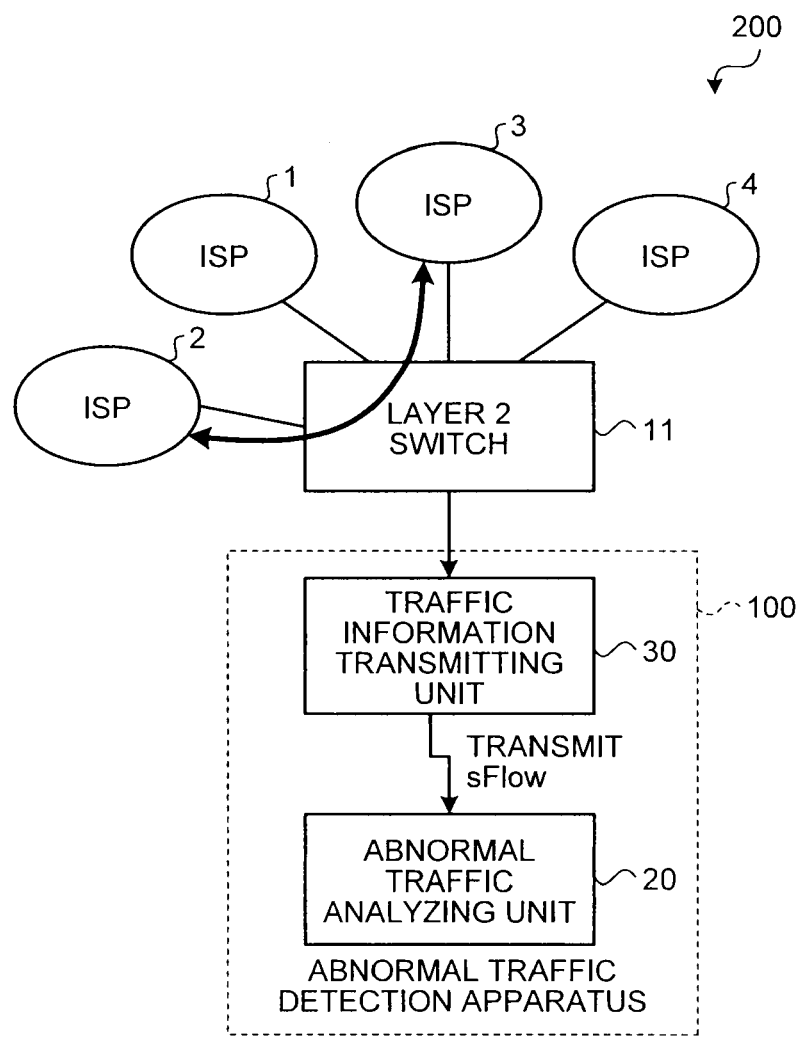
FIG. 2 is a diagram illustrating an abnormal traffic detection system equipped with an abnormal traffic detection apparatus according to the first embodiment.

FIG. 2 is a diagram illustrating a structure of an abnormal traffic detection system equipped with the abnormal traffic detection apparatus according to the first embodiment of the invention. The abnormal traffic detection system 200 comprises the ISPs 1 to 4, the layer 2 switch 11 connected to the ISPs 1 to 4 via representative routers (not shown) of each of the ISPs 1 to 4, and the abnormal traffic detection apparatus 100 connected to the layer 2 switch 11.

In the abnormal traffic detection system 200, the IX as an observation point of the traffics is configured with the layer 2 switch 11 and the representative routers of the respective ISPs 1 to 4. Each of the ISPs 1 to 4 is a communication apparatus for making communication with other ISPs via the layer 2 switch 11.

The abnormal traffic detection apparatus 100 has a traffic information transmitting unit 30 connected to the layer 2 switch 11, and an abnormal traffic analyzing unit 20 connected to the traffic information transmitting unit 30. In the abnormal traffic detection apparatus 100 according to the present embodiment, the traffic information transmitting unit 30 monitors the traffics flowing through the layer 2 switch 11 and transmits the information on the monitored traffics as sFlow packet to the abnormal traffic analyzing unit 20. The abnormal traffic analyzing unit 20 receives the sFlow packet transmitted from the traffic information transmitting unit 30 and analyzes the contents of the received sFlow packet to detect an abnormal traffic.

Figure 3:
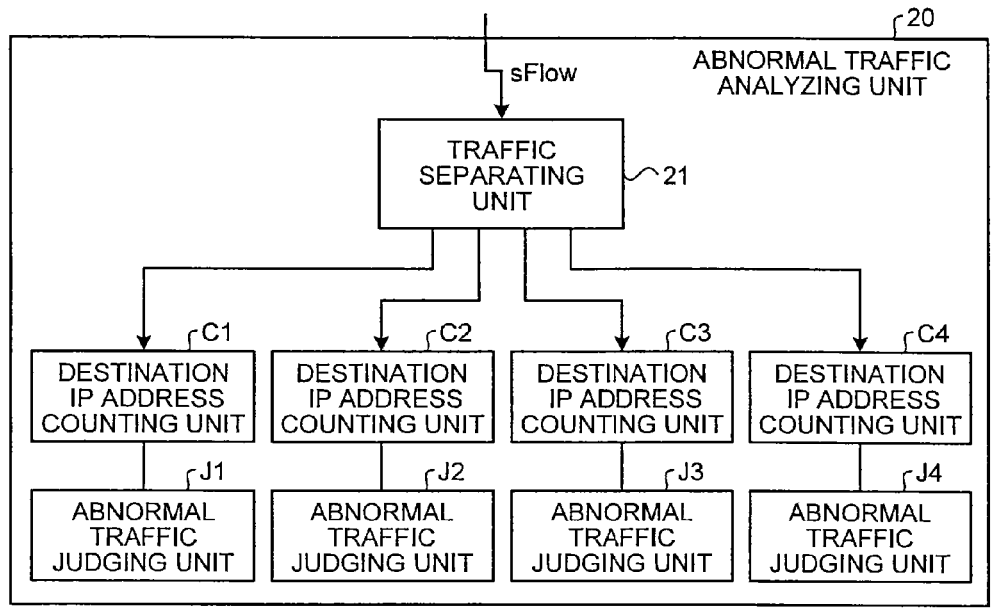
FIG. 3 is a bock diagram illustrating a structure of an abnormal traffic analyzing unit.

A structure of the abnormal traffic analyzing unit 20 will be described. FIG. 3 is a block diagram illustrating the structure of the abnormal traffic analyzing unit. The abnormal traffic analyzing unit 20 has a traffic separating unit (storage controlling unit) 21, destination IP address counting units (amount information storing units) C1 to C4, and abnormal traffic judging units J1 to J4.

The destination IP address counting units C1 to C4 are connected to the traffic separating unit 21. The abnormal traffic judging unit J1 is connected to the destination IP address counting unit C1 and the abnormal traffic judging unit J2 is connected to the destination IP address counting unit C2. In addition, the abnormal traffic judging unit J3 is connected to the destination IP address counting unit C3 and the abnormal traffic judging unit J4 is connected to the destination IP address counting unit C4.

In the abnormal traffic analyzing unit 20, the destination IP address counting units and the abnormal traffic judging units are arranged as many as the ISPs connected to the IX. Since the abnormal traffic detection system 200 according to the present embodiment comprises four ISPs, four destination IP address counting units and four abnormal traffic judging units are provided. The destination IP address counting unit C1 corresponds to the ISP1 and the destination IP address counting unit C2 corresponds to the ISP2. In addition, the destination IP address counting unit C3 corresponds to the ISP3 and the destination IP address counting unit C4 corresponds to the ISP4.

The traffic separating unit 21 separates the traffics on the basis of the ISPs through which the traffics are to be routed. Specifically, the traffic separating unit 21 sequentially reads frame samples (such as Ether (trademark) frames) contained in the received sFlow packet from the beginning of the frame samples, for example. The traffic separating unit 21 extracts the destination MAC address and the destination VLAN from the read frame samples. Also, the traffic separating unit 21 extracts the destination IP address and the frame sample size from the read frame sample.

Then, the traffic separating unit 21 retrieves the ISP corresponding to the combination of the extracted MAC address and VLAN from IX management information described later (information on the representative routers of the ISPs managed by the IX). The traffic separating unit 21 transmits the extracted destination IP address and the frame sample size to the destination IP address counting unit (any one of the destination IP address counting units C1 to C4) corresponding to the retrieved ISP.

The destination IP address counting units C1 to C4 hold the counter tables 101 to 104 described later (information tables for storing the number of times of appearance of the frame samples corresponding to the destination IP address or their size), respectively.

The destination IP address counting units C1 to C4 retrieve the destination IP address received from the traffic separating unit 21 from their own counter tables, respectively. When the destination IP address (index, described later) to be retrieved is not present in the counter tables, the destination IP address counting units C1 to C4 add an index to be retrieved to the index in their own counter tables, respectively.

In addition, when receiving the destination IP address and the frame sample size from the traffic separating unit 21, the destination IP address counting units C1 to C4 use the received information to update their own counter tables, respectively.

The abnormal traffic judging units J1 to J4 analyze the contents of the sFlow packet, which has been received from the IX by the abnormal traffic analyzing unit 20, to detect an abnormal traffic. Specifically, the abnormal traffic judging units J1 to J4 compare a "counter" value of each index in the counter tables 101 to 104 monitored by the abnormal traffic judging units J1 to J4 with threshold value information (information on the threshold value used for judging the abnormal traffic detection) previously stored in the judging units at predetermined intervals (for each constant period, for example), respectively. The abnormal traffic judging units J1 to J4 detect an abnormal traffic on the basis of the comparison result.

Next, an operation procedure of the abnormal traffic detection apparatus 100 will be described. The traffic information transmitting unit 30 of the abnormal traffic detection apparatus 100 monitors the traffics flowing through the layer 2 switch 11. Then, the traffic information transmitting unit 30 transmits the information on the monitored traffics as an sFlow packet to the abnormal traffic analyzing unit 20.

An operation of the abnormal traffic analyzing unit 20 when the sFlow packet is transmitted from the traffic information transmitting unit 30 to the abnormal traffic analyzing unit 20 will be described. At first, a process of counting the destination IP addresses on the basis of the frame samples contained in the sFlow packet will be described and then an abnormal traffic detection process will be described.

Figure 4:
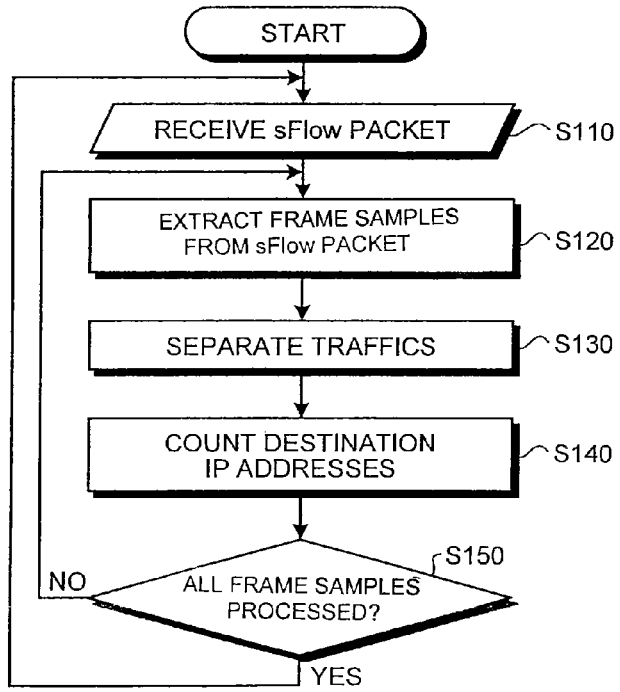
FIG. 4 is a flowchart illustrating a procedure of a destination IP address count process.

FIG. 4 is a flowchart illustrating a procedure of the destination IP address count process. The abnormal traffic analyzing unit 20 receives the sFlow packet transmitted from the layer 2 switch 11 of the IX via the traffic information transmitting unit 30 (step S110).

FIG. 5 is a diagram illustrating one example of the sFlow packet transmitted from the layer 2 switch. The sFlow packet includes one or more frame samples (sFlow packet samples), where each frame sample is associated with "sample number", "destination MAC address", "destination VLAN", "destination IP address" and "size".

The "sample number" is information for identifying the frame samples and the "destination MAC address" is a destination MAC (Media Access Control) address of the frame sample. In addition, the "destination VLAN" is information for identifying a VLAN (Virtual Local Area Network) as the destination of the frame sample and the "destination IP address" is a destination IP address of the frame sample. The "size" is a size of the frame sample.

For example, the frame sample having the "sample number" of "1" has the "destination MAC address" of "0000.0000.0001" and the "destination VLAN" of "1". In addition, the "destination IP address" of the frame sample is "192.168.1.1" and the "size" thereof is "100". In the following, an operation of the abnormal traffic analyzing unit 20 when the abnormal traffic analyzing unit 20 receives the sFlow packet indicated in FIG. 5 from the layer 2 switch 11 of the IX will be described.

When receiving the sFlow packet transmitted from the layer 2 switch 11, the abnormal traffic analyzing unit 20 transmits the sFlow packet to the traffic separating unit 21. The traffic separating unit 21 sequentially reads the frame samples contained in the received sFlow packet from the beginning of the frame samples.

The traffic separating unit 21 reads the frame sample having the "sample number" of "1" from the sFlow packet (step S120). The traffic separating unit 21 extracts the destination MAC address and the destination VLAN from the read frame sample. Then, the traffic separating unit 21 retrieves the ISP corresponding to (matching with) the combination of the extracted MAC address and VLAN from the IX management information indicated in FIG. 6.

FIG. 6 is a diagram illustrating a structure of the IX management information. The IX management information is a list (information table) of "MAC address" and "destination VLAN" of the representative routers of the ISPs 1 to 4 illustrated in FIG. 2, where "ISP", "destination MAC address" and "destination VLAN" are associated with one another. The "ISP" is information for identifying the ISPs.

In the embodiment, the ISP having the "ISP" of "1" is the ISP1 and the ISP having the "ISP" of "2" is the ISP2. The ISP having the "ISP" of "3" is the ISP3 and the ISP having the "ISP" of "4" is the ISP4.

The "destination MAC address" and the "destination VLAN" of the IX management information are the MAC address and the VLAN of an interface of the representative router as a connection point that is used when the ISPs 1 to 4 are connected to the IX. The "destination MAC address" and the "destination VLAN" are information utilized by the IX for customer management (management of the ISPs 1 to 4 connected to the IX).

The frame sample having the "sample number" of "1" has the "destination MAC address" of "0000.0000.0001" and the "destination VLAN" of "1". The traffic separating unit 21 retrieves the ISP matching with the "destination MAC address" and the "destination VLAN" from the IX management information. As indicated in the IX management information of FIG. 6, the ISP having the "destination MAC address" of "0000.0000.0001" and the "destination VLAN" of "1" is the ISP1. Thus, the traffic separating unit 21 judges that the frame sample having the "sample number" of "1" is the traffic toward the ISP1 (the ISP to be routed is the ISP1). Then, the traffic separating unit 21 associates the traffic having the "sample number" of "1" with the ISP1.

The traffic separating unit 21 extracts the "destination IP address" and the "size" as the information on the frame sample having the "sample number" of "1" from the sFlow packet. Thereby, the traffic separating unit 21 separates (extracts) the traffic having the "sample number" of "1" as the traffic of the ISP1 from the sFlow packet (step S130). The traffic separating unit 21 transmits the "destination IP address" of "192.168.1.1" and the "size" of "100" as the information on the frame sample having the "sample number" of "1" to the destination IP address counting unit C1 (the destination IP address counting unit corresponding to the ISP1). The destination IP address counting unit C1 receives the "destination IP address" of "192.168.1.1" and the "size" of "100" from the traffic separating unit 21.

The destination IP address counting units C1 to C4 hold the counter tables 101 to 104 illustrated in FIGS. 7 to 10, respectively. Each of the counter tables 101 to 104 stored in the destination IP address counting units C1 to C4 is an independent table. The counter table 101 indicated in FIG. 7 is the counter table of the destination IP address counting unit C1 and the counter table 102 indicated in FIG. 8 is the counter table of the destination IP address counting unit C2. In addition, the counter table 103 indicated in FIG. 9 is the counter table of the destination IP address counting unit C3 and the counter table 104 indicated in FIG. 10 is the counter table of the destination IP address counting unit C4.

The counter tables 101 to 104 indicated in FIGS. 7 to 10 are an information table storing therein the "destination IP address" (index), and the number of times of appearance of the frame sample and the total size corresponding to the index. Each of the counter tables 101 to 104 stores therein the number of times of appearance of each index (value of "counter") and the "size" of the frame sample corresponding to each index per index and stores therein the total number of times of appearance of all the indexes (value of "total counter") and the "total size" of all the indexes.

For example, the counter table 101 indicated in FIG. 7 indicates that the "counter" having the "destination IP address" of "192.168.1.1" is "1" and its "size" is "100". In addition, the counter table 101 indicates that the "total counter" having the "destination IP address" of "192.168.1.1" is "1" and its "total size" is "100".

Incidentally, no index is present in the initial state in each of the counter tables 101 to 104. The destination IP address counting units C1 to C4 add a new index to the counter tables 101 to 104 when receiving a new "destination IP address" from the traffic separating unit 21, respectively.

The destination IP address counting unit C1 retrieves the "destination IP address" of "192.168.1.1" received from the traffic separating unit 21 from the index in its own counter table (the counter table 101 indicated in FIG. 7).

When the index to be retrieved is not present in the counter table 101 of the destination IP address counting unit C1, the destination IP address counting unit C1 adds the index to be retrieved to the index of its own counter table 101.

Since no index is present in the counter table 101 in the initial state, the destination IP address counting unit C1 adds "192.168.1.1" to the index of the counter table 101.

Further, the destination IP address counting unit C1 associates "1" of the "counter" and "100" of the "size" with the added index and stores them in the counter table 101. The destination IP address counting unit C1 increments the value of the "total counter" by 1 to be "1", and sets the "total size" be "100". Then, the destination IP address counting unit C1 associates "1" of the "total counter" and "100" of the "total size" with the added index and stores them in the counter table 101 (step S140). At this time, the state of the counter table stored in the destination IP address counting unit C1 is the counter table 101 indicated in FIG. 7.

Next, the traffic separating unit 21 judges whether the destination IP address has been counted for all the frame samples contained in the received sFlow packet (step S150).

If the destination IP address has not been counted for all the read frame samples (step S150, No), the traffic separating unit 21 reads the frame sample having the next "sample number" from the sFlow packet. The traffic separating unit 21 reads the frame sample having the "sample number" of "2" from the sFlow packet (step S120). The traffic separating unit 21 extracts the destination MAC address and the destination VLAN from the read frame sample.

Then, the traffic separating unit 21 retrieves the ISP matching with the combination of the extracted MAC address and VLAN from the IX management information indicated in FIG. 6. The frame sample having the "sample number" of "2" has the "destination MAC address" of "0000.0000.0002" and the "destination VLAN" of "1". The traffic separating unit 21 retrieves the ISP matching with the "destination MAC address" and the "destination VLAN" from the IX management information. As indicated in the IX management information of FIG. 6, the ISP having the "destination MAC address" of "0000.0000.0002" and the "destination VLAN" of "1" is the ISP2. Therefore, the traffic separating unit 21 judges that the frame sample having the "sample number" of "2" is the traffic toward the ISP2 (the ISP to be routed is the ISP2). Then, the traffic separating unit 21 associates the traffic having the "sample number" of "2" with the ISP2.

The traffic separating unit 21 extracts the "destination IP address" and the "size" as the information on the frame sample having the "sample number" of "2" from the sFlow packet. Thereby, the traffic separating unit 21 separates the traffic having the "sample number" of "2" as the traffic of the ISP2 from the sFlow packet (step S130). The traffic separating unit 21 transmits "192.168.2.1" of the "destination IP address" and "100" of the "size" as the information on the frame sample having the "sample number" of "2" to the destination IP address counting unit C2 (the destination IP address counting unit corresponding to the ISP2).

The destination IP address counting unit C2 receives "192.168.2.1" of the "destination IP address" and "100" of the "size" from the traffic separating unit 21. The destination IP address counting unit C2 retrieves "192.168.2.1" of the "destination IP address" received from the traffic separating unit 21 from among the indexes of its own counter table.

When the index to be retrieved is not present in the counter table 102 of the destination IP address counting unit C2, the destination IP address counting unit C2 adds the index to be retrieved to the index of its own counter table 102.

Since no index is present in the counter table 102 in the initial state, the destination IP address counting unit C2 adds "192.168.2.1" to the index of the counter table 102.

Further, the destination IP address counting unit C2 associates "1" of the "counter" and "100" of the "size" with the added index and stores them in the counter table 102. The destination IP address counting unit C2 increments the value of the "total counter" by 1 to be "1" and sets the "total size" be "100". Then, the destination IP address counting unit C2 associates "1" of the "total counter" and "100" of the "total size" with the added index and stores them in the counter table 102 (step S140).

Next, the traffic separating unit 21 judges whether the destination IP address has been counted for all the frame samples contained in the received sFlow packet (step S150).

If the destination IP address has not been counted for all the read frame samples (step S150, No), the traffic separating unit 21 reads the frame sample having the next "sample number" from the sFlow packet. The traffic separating unit 21 reads the frame sample having the "sample number" of "3" from the sFlow packet (step S120). The traffic separating unit 21 extracts the destination MAC address and the destination VLAN from the read frame sample.

Then, the traffic separating unit 21 retrieves the ISP matching with the combination of the extracted MAC address and VLAN from the IX management information indicated in FIG. 6. The frame sample having the "sample number" of "3" has the "destination MAC address" of "0000.0000.0003" and the "destination VLAN" of "2". The traffic separating unit 21 retrieves the ISP matching with the "destination MAC address" and the "destination VLAN" from the IX management information. As indicated in the IX management information of FIG. 6, the ISP having the "destination MAC address" of "0000.0000.0003" and the "destination VLAN" of "2" is the ISP4. Thus, the traffic separating unit 21 judges that the frame sample having the "sample number" of "3" is the traffic toward the ISP4 (the ISP to be routed is the ISP4). Then, the traffic separating unit 21 associates the traffic having the "sample number" of "3" with the ISP4.

The traffic separating unit 21 extracts the "destination IP address" and the "size" as the information on the frame sample having the "sample number" of "3" from the sFlow packet. Thereby, the traffic separating unit 21 separates the traffic having the "sample number" of "3" as the traffic of the ISP4 from the sFlow packet (step S130). The traffic separating unit 21 transmits "192.168.3.1" of the "destination IP address" and "100" of the "size" as the information on the frame sample having the "sample number" of "3" to the destination IP address counting unit C4 (the destination IP address counting unit corresponding to the ISP4).

The destination IP address counting unit C4 receives "192.168.3.1" of the "destination IP address" and "100" of the "size" from the traffic separating unit 21. The destination IP address counting unit C4 retrieves "192.168.3.1" of the "destination IP address" received from the traffic separating unit 21 from the indexes of its own counter table.

When the index to be retrieved is not present in the counter table 104 of the destination IP address counting unit C4, the destination IP address counting unit C4 adds the index to be retrieved to the indexes of its own counter table 104.

Since no index is present in the counter table 104 in the initial state, the destination IP address counting unit C4 adds "192.168.3.1" to the index of the counter table 104.

Further, the destination IP address counting unit C4 associates "1" of the "counter" and "100" of the "size" with the added index and stores the same in the counter table 104. In addition, the destination IP address counting unit C4 increments the value of the "total counter" by 1 to be "1" and sets the "total size" be "100". Then, the destination IP address counting unit C4 associates "1" of the "total counter" and "100" of the "total size" with the added index and stores them in the counter table 104 (step S140). At this time, the state of the counter table stored in the destination IP address counting unit C4 is the counter table 104 indicated in FIG. 10.

Next, the traffic separating unit 21 judges whether the destination IP address has been counted for all the frame samples contained in the received sFlow packet (step S150).

If the destination IP address has not been counted for all the read frame samples (step S150, No), the traffic separating unit 21 reads the frame sample having the next "sample number" from the sFlow packet. The traffic separating unit 21 reads the frame sample having the "sample number" of "4" from the sFlow packet (step S120). The traffic separating unit 21 extracts the destination MAC address and the destination VLAN from the read frame sample.

Then, the traffic separating unit 21 retrieves the ISP matching with the combination of the extracted MAC address and VLAN from the IX management information indicated in FIG. 6. The frame sample having the "sample number" of "4" has the "destination MAC address" of "0000.0000.0002" and the "destination VLAN" of "1". The traffic separating unit 21 retrieves the ISP matching with the "destination MAC address" and the "destination VLAN" from the IX management information. As indicated in the IX management information of FIG. 6, the ISP having the "destination MAC address" of "0000.0000.0002" and the "destination VLAN" of "1" is the ISP2. Thus, the traffic separating unit 21 judges that the frame sample having the "sample number" of "4" is the traffic toward the ISP2 (the ISP to be routed is the ISP2). Then, the traffic separating unit 21 associates the traffic having the "sample number" of "4" with the ISP2.

The traffic separating unit 21 extracts the "destination IP address" and the "size" as the information on the frame sample having the "sample number" of "4" from the sFlow packet. Thereby, the traffic separating unit 21 separates the traffic having the "sample number" of "4" as the traffic of the ISP2 from the sFlow packet (step S130). The traffic separating unit 21 transmits "192.168.2.2" of the "destination IP address" and "100" of the "size" as the information on the frame sample having the "sample number" of "4" to the destination IP address counting unit C2 (the destination IP address counting unit corresponding to the ISP2).

The destination IP address counting unit C2 receives "192.168.2.2" of the "destination IP address" and "100" of the "size" from the traffic separating unit 21. The destination IP address counting unit C2 retrieves "192.168.2.2" of the "destination IP address" received from the traffic separating unit 21 from the indexes of its own counter table (the counter table 102 indicated in FIG. 8).

Since the index "192.168.2.1" previously stored as the information on the frame sample having the "sample number" of "2" is present in the counter table 102 stored in the destination IP address counting unit C2 but the index "192.168.2.2" to be retrieved is not present therein, the destination IP address counting unit C2 adds "192.168.2.2" to the index in the counter table 102. Further, the destination IP address counting unit C2 associates "1" of the "counter" and "100" of the "size" with the added index and stores (adds) them in the counter table 102. In addition, the destination IP address counting unit C2 increments the value of the "total counter" by 1 to be "2" and adds 100 to the "total size" to be "200". Then, the destination IP address counting unit C2 associates "2" of the "total counter" and "200" of the "total size" with the added index and stores (overwrites) them in the counter table 102 (step S140). At this time, the state of the counter table stored in the destination IP address counting unit C2 is the counter table 102 indicated in FIG. 8.

Next, the traffic separating unit 21 judges whether the destination IP address has been counted for all the frame samples contained in the received sFlow packet (step S150).

If the destination IP address has not been counted for all the read frame samples (step S150, No), the traffic separating unit 21 reads the frame sample having the next "sample number" from the sFlow packet. The traffic separating unit 21 reads the frame sample having the "sample number" of "5" from the sFlow packet (step S120). The traffic separating unit 21 extracts the destination MAC address and the destination VLAN from the read frame sample.

Then, the traffic separating unit 21 retrieves the ISP matching with the combination of the extracted MAC address and VLAN from the IX management information indicated in FIG. 6. The frame sample having the "sample number" of "5" has the "destination MAC address" of "0000.0000.0003" and the "destination VLAN" of "1". The traffic separating unit 21 retrieves the ISP matching with the "destination MAC address" and the "destination VLAN" from the IX management information. As indicated in the IX management information of FIG. 6, the ISP having the "destination MAC address" of "0000.0000.0003" and the "destination VLAN" of "1" is the ISP3. Thus, the traffic separating unit 21 judges that the frame sample having the "sample number" of "5" is the traffic toward the ISP3 (the ISP to be routed is the ISP3). Then, the traffic separating unit 21 associates the traffic having the "sample number" of "5" with the ISP3.

The traffic separating unit 21 extracts the "destination IP address" and the "size" as the information on the frame sample having the "sample number" of "5" from the sFlow packet. Thus, the traffic separating unit 21 separates the traffic having the "sample number" of "5" as the traffic of the ISP3 from the sFlow packet (step S130). The traffic separating unit 21 transmits "192.168.3.2" of the "destination IP address" and "100" of the "size" as the information on the frame sample having the "sample number" of "5" to the destination IP address counting unit C3 (the destination IP address counting unit corresponding to the ISP3).

The destination IP address counting unit C3 receives "192.168.3.2" of the "destination IP address" and "100" of the "size" from the traffic separating unit 21. The destination IP address counting unit C4 retrieves "192.168.3.2" of the "destination IP address" received from the traffic separating unit 21 from the index in its own counter table.

When the index to be retrieved is not present in the counter table 103 of the destination IP address counting unit C3, the destination IP address counting unit C3 adds the index to be retrieved to the index in its own counter table 103.

Since no index is present in the counter table 103 in the initial state, the destination IP address counting unit C3 adds "192.168.3.2" to the index in the counter table 103.

In addition, the destination IP address counting unit C3 associates "1" of the "counter" and "100" of the "size" with the added index and stores them in the counter table 103. Further, the destination IP address counting unit C3 increments the value of the "total counter" by 1 to be "1" and sets the "total size" be "100". Then, the destination IP address counting unit C3 associates "1" of the "total counter" and "100" of the "total size" with the added index and stores them in the counter table 103 (step S140).

Next, the traffic separating unit 21 judges whether the destination IP address has been counted for all the frame samples contained in the received sFlow packet (step S150).

If the destination IP address has not been counted for all the read frame samples (step S150, No), the traffic separating unit 21 reads the frame sample having the next "sample number" from the sFlow packet. The traffic separating unit 21 reads the frame sample having the "sample number" of "6" from the sFlow packet (step S120). The traffic separating unit 21 extracts the destination MAC address and the destination VLAN from the read frame sample.

Next, the traffic separating unit 21 retrieves the ISP matching with the combination of the extracted MAC address and VLAN from the IX management information indicated in FIG. 6. The frame sample having the "sample number" of "6" has the "destination MAC address" of "0000.0000.0003" and the "destination VLAN" of "1". The traffic separating unit 21 retrieves the ISP matching with the "destination MAC address" and the "destination VLAN" from the IX management information. As indicated in the IX management information of FIG. 6, the ISP having the "destination MAC address" of "0000.0000.0003" and the "destination VLAN" of "1" is the ISP3. Thus, the traffic separating unit 21 judges that the frame sample having the "sample number" of "6" is the traffic toward the ISP3 (the ISP to be routed is the ISP3). Then, the traffic separating unit 21 associates the traffic having the "sample number" of "6" with the ISP3.

The traffic separating unit 21 extracts the "destination IP address" and the "size" as the information on the frame sample having the "sample number" of "6" from the sFlow packet. Thereby, the traffic separating unit 21 separates the traffic having the "sample number" of "6" as the traffic of the ISP3 from the sFlow packet (step S130). The traffic separating unit 21 transmits "192.168.3.2" of the "destination IP address" and "100" of the "size" as the information on the frame sample having the "sample number" of "6" to the destination IP address counting unit C3 (the destination IP address counting unit corresponding to the ISP3).

The destination IP address counting unit C3 receives "192.168.3.2" of the "destination IP address" and "100" of the "size" from the traffic separating unit 21. The destination IP address counting unit C3 retrieves "192.168.3.2" of the "destination IP address" received from the traffic separating unit 21 from the index in its own counter table 103.

Since the same index "192.168.3.2" as that to be retrieved is previously stored as the information on the frame sample having the "sample number" of "5" in the counter table 103 stored in the destination IP address counting unit C3, the destination IP address counting unit C3 can extract "192.168.3.2" of the "destination IP address" from the counter table 103.

The destination IP address counting unit C3 increments the "counter" of the frame sample corresponding to the extracted index by 1 to be "2" and adds 100 to the "size" of the frame sample corresponding to the extracted index to be "200". Then, the destination IP address counting unit C3 associates "2" of the "counter" and "200" of the "size" with the extracted index and stores (overwrites) them in the counter table 103.

Further, the destination IP address counting unit C3 increments the value of the "total counter" by 1 to be "2" and adds 100 to the "total size" to be "200". Then, the destination IP address counting unit C3 associates "2" of the "total counter" and "200" of the "total size" with the added index and stores (overwrites) them in the counter table 103 (step S 140). At this time, the state of the counter table stored in the destination IP address counting unit C3 is the counter table 103 indicated in FIG. 9. Following that, the abnormal traffic analyzing unit 20 repeats the processes of steps S120 to S150 each time an sFlow packet is received.

When the traffic separating unit 21 judges that the destination IP address has been counted for all the frame samples contained in the received sFlow packet (step S150, Yes), the abnormal traffic analyzing unit 20 shifts to a state for waiting for a new sFlow packet. Thereafter, the abnormal traffic judging units J1 to J4 analyzes the contents of the sFlow packet that has been received by the abnormal traffic analyzing unit 20 from the IX to detect an abnormal traffic.

Figures 11, 12:
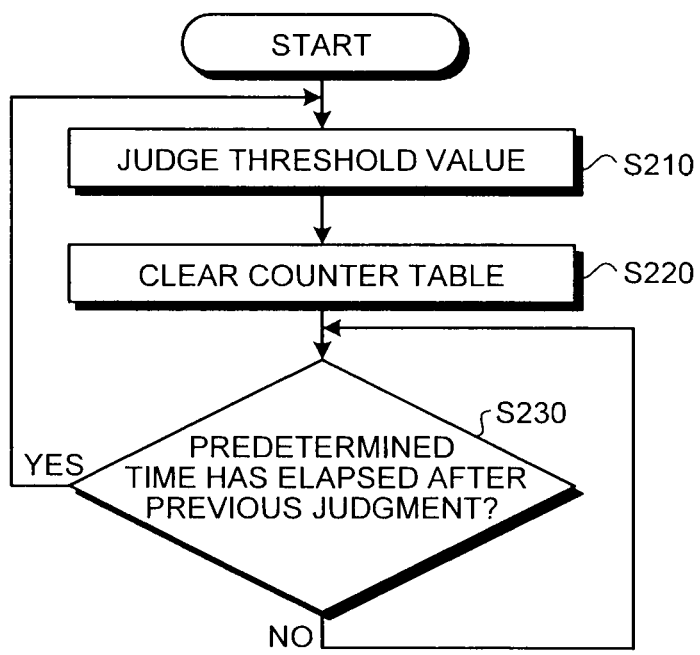
FIG. 11 is a flowchart illustrating a procedure of an abnormal traffic detection process.
FIG. 12 is a diagram illustrating a structure of threshold value information (1)

Next, the abnormal traffic detection process performed by the abnormal traffic judging units J1 to J4 will be described. FIG. 11 is a flowchart illustrating a procedure of the abnormal traffic detection process. The abnormal traffic judging units J1 to J4 compare the value of the "counter" of each index of their own counter tables 101 to 104 with the threshold value information previously stored in the abnormal traffic judging units J1 to J4 at predetermined intervals (for each constant period, for example).

Specifically, the abnormal traffic judging unit J1 compares the value of the "counter" of each index stored in the destination IP address counting unit C1 with the previously-held threshold value (threshold value information indicated in FIG. 12). The abnormal traffic judging unit J2 compares the value of the "counter" of each index stored in the destination IP address counting unit C2 with the previously-held threshold value (threshold value information indicated in FIG. 13). In addition, the abnormal traffic judging unit J3 compares the value of the "counter" of each index stored in the destination IP address counting unit C3 with the previously-held threshold value (threshold value information indicated in FIG. 14). The abnormal traffic judging unit J4 compares the value of the "counter" of each index stored in the destination IP address counting unit C4 with the previously-held threshold value (threshold value information indicated in FIG. 15) (step S210).

Figures 15, 16:
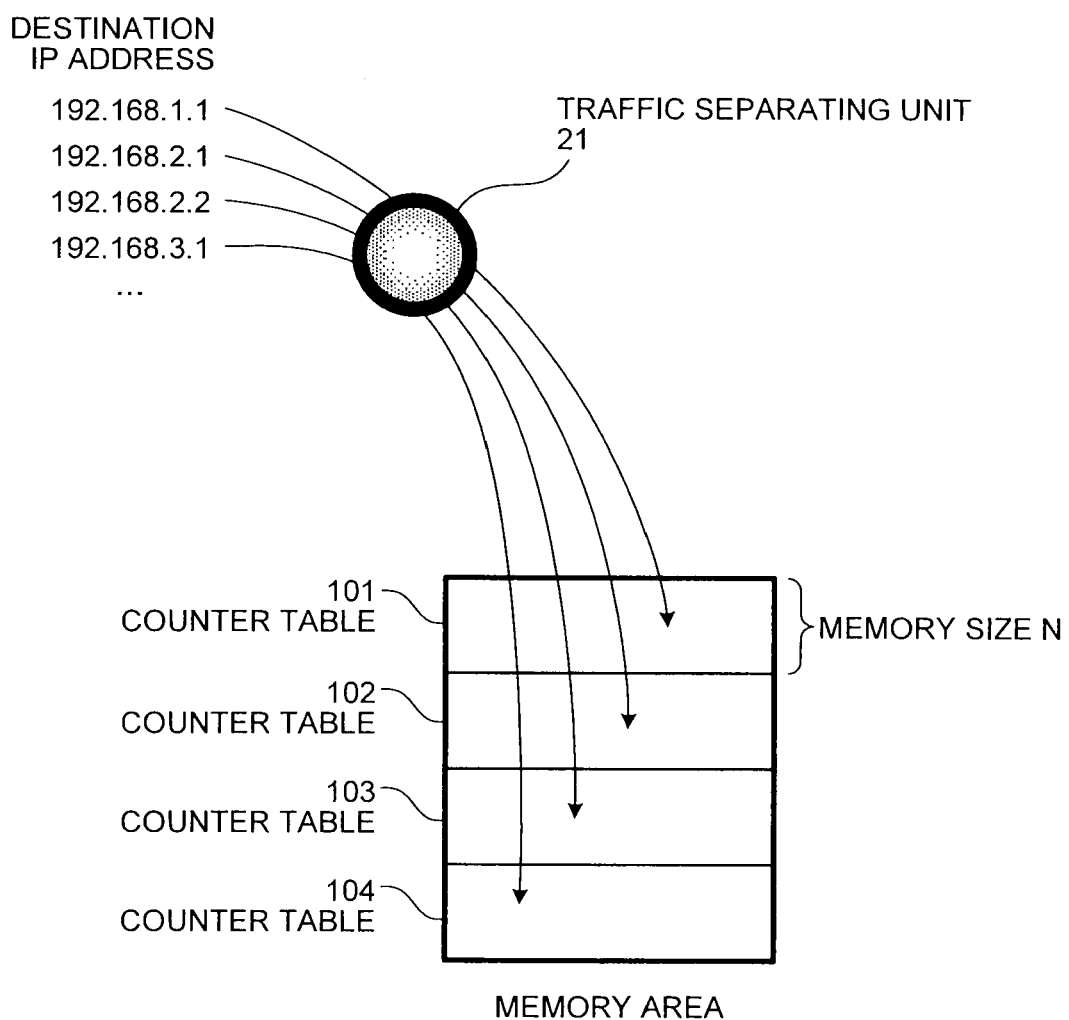
FIG. 15 is a diagram illustrating a structure of threshold value information (4)
FIG. 16 is a diagram explaining the calculation amount when the amount of traffics is calculated using the abnormal traffic detection system.

FIG. 12 is a diagram illustrating a structure of the threshold value information stored in the abnormal traffic judging unit J1 and FIG. 13 is a diagram illustrating a structure of the threshold value information stored in the abnormal traffic judging unit J2. In addition, FIG. 14 is a diagram illustrating a structure of the threshold value information stored in the abnormal traffic judging unit J3 and FIG. 15 is a diagram illustrating a structure of the threshold value information stored in the abnormal traffic judging unit J4.

The threshold value information indicated in FIGS. 12 to 15 are information tables in which the "counter threshold value" and the "total counter threshold value" are associated with each other. The "counter threshold value" is a threshold value to be compared with the value of the "counter" (the value of the "counter" indicated in FIGS. 7 to 10) of the frame samples counted by the destination IP address counting units C1 to C4. The "size threshold value" as the threshold value of the frame sample size is associated with the "counter threshold value". The "total counter threshold value" is a threshold value to be compared with the sum of the values of the "counter" of the frame samples (the values of the "total counter" indicated in FIGS. 7 to 10). The "total size threshold value" as the threshold value of the "total size" of the frame sample is associated with the "total counter threshold value".

For example, the threshold value information indicated in FIG. 12 has the "counter threshold value" of "2" and the "size threshold value" of "200". Further, the "total counter threshold value" is "2" and the "total size threshold value" is "200".

The abnormal traffic judging units J1 to J4 detect an abnormal traffic on the basis of the comparison result between the counter tables 101 to 104 stored in the destination IP address counting units C1 to C4 and the threshold value information previously stored in the abnormal traffic judging units J1 to J4. The abnormal traffic judging units J1 to J4 judge that an abnormal traffic is present when the value of the "counter" or the value of the "size" for the index exceeds the "counter threshold value" or the "size threshold value" or when the value of the "total counter" or the value of the "total size" for the index exceeds the "total counter threshold value" or the "total size threshold value", for example.

After reading the value of the "counter", the value of the "size", the value of the "total counter", and the value of the "total size" for the index from the destination IP address counting units C1 to C4, the abnormal traffic judging units J1 to J4 cause the destination IP address counting units C1 to C4 to clear the values of the counter tables 101 to 104, respectively (step S220). The abnormal traffic judging units J1 to J4 judge whether an abnormal traffic is present, and then shifts to the standby state until a predetermined time elapses (step S230, No).

When the predetermined time has elapsed after the abnormal traffic judging units J1 to J4 previously judged whether an abnormal traffic is present (step S230, Yes), the abnormal traffic judging units J1 to J4 compare the value of each index of their own counter tables 101 to 104 with their own previously-held threshold value information (step S210). The abnormal traffic judging units J1 to J4 repeat the processes of steps S210 to S230.

Next, the abnormal traffic judgment process performed by the abnormal traffic judging units J1 to J4 will be described in detail. The abnormal traffic judging unit J1 reads the value "1" of the "counter" and the value "100" of the "size" for the index "192.168.1.1" from the counter table 101 stored in the destination IP address counting unit C1.

Then, the abnormal traffic judging unit J1 compares the "counter threshold value" of "2", which is stored in itself and is indicated in FIG. 12, with the "counter" value of "1" read from the destination IP address counting unit C1. In addition, the abnormal traffic judging unit J1 compares the "size threshold value" of "200" with the size of "100" read from the destination IP address counting unit C1.

The value of the "counter" read from the destination IP address counting unit C1 by the abnormal traffic judging unit J1 is smaller than the "counter threshold value" stored in the abnormal traffic judging unit J1. In addition, the value of the "size" read from the destination IP address counting unit C1 by the abnormal traffic judging unit J1 is smaller than the value of the "size threshold value" stored in the abnormal traffic judging unit J1.

Further, the abnormal traffic judging unit J1 reads the value "1" of the "total counter" and the value "100" of the "total size" for the index "192.168.1.1" from the counter table 101 stored in the destination IP address counting unit C1.

Then, the abnormal traffic judging unit J1 compares the "total counter threshold value" of "2" indicated in FIG. 12 with the "total counter" of "1" read from the destination IP address counting unit C1. In addition, the abnormal traffic judging unit J1 compares the "total size threshold value" of "200" with the "total size" of "100" read from the destination IP address counting unit C1.

The value of the "total counter" read from the destination IP address counting unit C1 by the abnormal traffic judging unit J1 is smaller than the "total counter threshold value" stored in the abnormal traffic judging unit J1. In addition, the value of the "total size" read from the destination IP address counting unit C1 by the abnormal traffic judging unit J1 is smaller than the "total size threshold value" stored in the abnormal traffic judging unit J1. Thus, the abnormal traffic judging unit J1 judges that an abnormal traffic is not present at the IX.

The abnormal traffic judging unit J2 reads the value "1" of the "counter" and the value "100" of the "size" for the index "192.168.2.1" from the counter table 102 stored in the destination IP address counting unit C2.

Then, the abnormal traffic judging unit J2 compares the "counter threshold value" of "2" indicated in FIG. 13 with the value "1" of the "counter" read from the destination IP address counting unit C2. In addition, the abnormal traffic judging unit J1 compares the "size threshold value" of "200" with the value "100" of the "size" read from the destination IP address counting unit C1.

The value of the "counter" for the index "192.168.2.1" read from the destination IP address counting unit C2 by the abnormal traffic judging unit J2 is smaller than the "counter threshold value" stored in the abnormal traffic judging unit J2. In addition, the value of the "size" for the index "192.168.2.1" read from the destination IP address counting unit C2 by the abnormal traffic judging unit J2 is smaller than the "size threshold value" stored in the abnormal traffic judging unit J1.

Further, the abnormal traffic judging unit J2 reads the value "2" of the "counter" and the value "100" of the "size" for the index "192.168.2.2" from the counter table 102 stored in the destination IP address counting unit C2.

Then, the abnormal traffic judging unit J2 compares the "counter threshold value" of "2" indicated in FIG. 13 with the value "1" of the "counter" read from the destination IP address counting unit C2. In addition, the abnormal traffic judging unit J2 compares the "size threshold value" of "200" with the value "100" of the "size" read from the destination IP address counting unit C2.

The value of the "counter" for the index "192.168.2.2" read from the destination IP address counting unit C2 by the abnormal traffic judging unit J2 is smaller than the "counter threshold value" stored in the abnormal traffic judging unit J2. In addition, the "size" for the index "192.168.2.2" read from the destination IP address counting unit C2 by the abnormal traffic judging unit J2 is smaller than the "size threshold value" stored in the abnormal traffic judging unit J1.

Further, the abnormal traffic judging unit J2 reads the value "2" of the "total counter" and the value "200" of the "total size" for the index "192.168.2.1" and the index "192.168.2.2" from the counter table 102 stored in the destination IP address counting unit C2.

Then, the abnormal traffic judging unit J2 compares the "total counter threshold value" of "2" indicated in FIG. 12 with the "total counter" of "2" read from the destination IP address counting unit C2. In addition, the abnormal traffic judging unit J2 compares the "total size threshold value" of "200" with the "total size" of "200" read from the destination IP address counting unit C2.

The value of the "total counter" read from the destination IP address counting unit C2 by the abnormal traffic judging unit J2 is equal to or larger than the value of the "total counter threshold value" stored in the abnormal traffic judging unit J2. In addition, the value of the "total size" read from the destination IP address counting unit C2 by the abnormal traffic judging unit J2 is equal to or larger than the value of the "total size threshold value" stored in the abnormal traffic judging unit J2. Thus, the abnormal traffic judging unit J2 judges that an abnormal traffic has occurred in the IX (detects an abnormal traffic). In this case, the abnormal traffic judging unit J2 judges that the contents of the abnormal traffic indicate that "the number of packets toward the ISP2 and the packet size are excessive".

The abnormal traffic judging unit J3 reads the value "2" of the "counter" and the "size" of "200" for the index "192.168.3.2" from the counter table 103 stored in the destination IP address counting unit C3.

Then, the abnormal traffic judging unit J3 compares the "counter threshold value" of "2" indicated in FIG. 14 with the value "2" of the "counter" read from the destination IP address counting unit C3. In addition, the abnormal traffic judging unit J3 compares the "size threshold value" of "200" with the "size" of "200" read from the destination IP address counting unit C3.

The value of the "counter" for the index "192.168.3.2" read from the destination IP address counting unit C3 by the abnormal traffic judging unit J3 is equal to or larger than the value of the "counter threshold value" stored in the abnormal traffic judging unit J3. In addition, the value of the "size" for the index "192.168.3.2" read from the destination IP address counting unit C3 by the abnormal traffic judging unit J3 is equal to or larger than the value of the "size threshold value" stored in the abnormal traffic judging unit J3.

Further, the abnormal traffic judging unit J3 reads the value "2" of the "total counter" and the value "200" of the "total size" for the index "192.168.3.2" from the counter table 103 stored in the destination IP address counting unit C3.

Then, the abnormal traffic judging unit J3 compares the "total counter threshold value" of "10" indicated in FIG. 14 with the "total counter" of "2" read from the destination IP address counting unit C3. In addition, the abnormal traffic judging unit J3 compares the "total size threshold value" of "800" with the "total size" of "200" read from the destination IP address counting unit C3.

The value of the "total counter" read from the destination IP address counting unit C3 by the abnormal traffic judging unit J3 is smaller than the "total counter threshold value" stored in the abnormal traffic judging unit J3. In addition, the value of the "total size" read from the destination IP address counting unit C3 by the abnormal traffic judging unit J3 is smaller than the value of the "total size threshold value" stored in the abnormal traffic judging unit J3.

Therefore, the abnormal traffic judging unit J3 judges that an abnormal traffic has occurred in the IX. In this case, the abnormal traffic judging unit J3 judges that the contents of the abnormal traffic indicate that "the number of packets for the index "192.168.3.2" and the packet size are excessive".

The abnormal traffic judging unit J4 reads the value "1" of the "counter" and the value "100" of the "size" for the index "192.168.3.1" from the counter table 104 stored in the destination IP address counting unit C4.

Then, the abnormal traffic judging unit J4 compares the "counter threshold value" of "5" indicated in FIG. 15 with the value "1" of the "counter" read from the destination IP address counting unit C4. In addition, the abnormal traffic judging unit J4 compares the "size threshold value" of "500" with the "size" of "100" read from the destination IP address counting unit C4.

The value of the "counter" read from the destination IP address counting unit C4 by the abnormal traffic judging unit J4 is smaller than the "counter threshold value" stored in the abnormal traffic judging unit J4. In addition, the value of the "size" read from the destination IP address counting unit C4 by the abnormal traffic judging unit J4 is smaller than the "size threshold value" stored in the abnormal traffic judging unit J4.

Further, the abnormal traffic judging unit J4 reads the value "1" of the "total counter" and the value "100" of the "total size" for the index "192.168.3.1" from the counter table 104 stored in the destination IP address counting unit C4.

Then, the abnormal traffic judging unit J4 compares the "total counter threshold value" of "5" indicated in FIG. 15 with the value "1" of the "total counter" read from the destination IP address counting unit C4. In addition, the abnormal traffic judging unit J4 compares the "total size threshold value" of "500" with the value "100" of the "total size" read from the destination IP address counting unit C4.

The value of the "total counter" read from the destination IP address counting unit C4 by the abnormal traffic judging unit J4 is smaller than the "total counter threshold value" stored in the abnormal traffic judging unit J4. In addition, the value of the "total size" read from the destination IP address counting unit C4 by the abnormal traffic judging unit J4 is smaller than the "total size threshold value" stored in the abnormal traffic judging unit J4. Thus, the abnormal traffic judging unit J4 judges that an abnormal traffic is not present at the IX.

In other words, when the values of the "counter" for the indexes read from the destination IP address counting units C1 to C4, the values of the "size" for the indexes, the values of the "total counter" for the indexes read from the destination IP address counting units C1 to C4, and the values of the "total size" for the indexes are smaller than the "counter threshold value", the "size threshold value", the "total counter threshold value" and the "total size threshold value", respectively, the abnormal traffic judging units J1 to J4 judge that an abnormal traffic is not present in the IX.

Further, when the values of the "counter" for the indexes read from the destination IP address counting units C1 to C4 are equal to or larger than the "counter threshold value", the abnormal traffic judging units J1 to J4 judge that an abnormal traffic has occurred in the IX. In this case, the abnormal traffic judging units J1 to J4 judge that the amount of packets for the indexes that are subjected to the abnormal traffic detection is excessive, among the indexes stored in the counter tables 101 to 104 indicated in FIGS. 7 to 10.

Further, when the values of the "size" for the indexes read from the destination IP address counting units C1 to C4 are equal to or larger than the "size threshold value", the abnormal traffic judging units J1 to J4 judge that an abnormal traffic has occurred in the IX. In this case, the abnormal traffic judging units J1 to J4 judge that the amount of packets for the index that are subjected to the abnormal traffic detection is excessive, among the indexes stored in the counter tables 101 to 104 indicated in FIGS. 7 to 10.

When the value of the "counter" for the index is equal to or larger than the value of the "counter threshold value" and the value of the "size" for the index is equal to or larger than the value of the "size threshold value", the abnormal traffic judging units J1 to J4 may judge that an abnormal traffic has occurred in the IX. Also in this case, the abnormal traffic judging units J1 to J4 judge that the amount of packets for the index that are subjected to the abnormal traffic detection is excessive, among the indexes stored in the counter tables 101 to 104 indicated in FIGS. 7 to 10.

Further, when the values of the "total counter" for the indexes read from the destination IP address counting units C1 to C4 are equal to or lager that the value of the "total counter threshold value", the abnormal traffic judging units J1 to J4 judge that an abnormal traffic has occurred in the IX. In this case, the abnormal traffic judging units J1 to J4 judge that the number of packets of the ISP (any of the ISPs 1 to 4) corresponding to each of the abnormal traffic judging units J1 to J4 (the abnormal traffic judging unit that judges that an abnormal traffic has occurred) is excessive.

When the values of the "total size" for the indexes read from the destination IP address counting units C1 to C4 are equal to or larger than the "total size threshold value", the abnormal traffic judging units J1 to J4 judge that an abnormal traffic has occurred in the IX. In this case, the abnormal traffic judging units J1 to J4 judge that the number of packets toward their corresponding ISP is excessive.

The abnormal traffic judging units J1 to J4 may judge that an abnormal traffic has occurred in the IX when the value of the "total counter" for the index is equal to or larger than the "total counter threshold value" and the value of the "total size" for the index is equal to or larger than the "total size threshold value". Also in this case, the abnormal traffic judging units J1 to J4 judge that the number of packets toward their corresponding ISP is excessive.

The abnormal traffic judging units J1 to J4 may judge that an abnormal traffic has occurred in the IX when the value of the "counter" is equal to or larger than the value of the "counter threshold value", the value of the "size" is equal to or larger than the value of the "size threshold value", the value of the "total counter" is equal to or larger than the value of the "total counter threshold value", and the value of the "total size" is equal to or larger than the value of the "total size threshold value".

A judgment on the abnormal traffic by the abnormal traffic judging units J1 to J4 may be made at any timing, respectively. A judgment on the abnormal traffic may be made by the abnormal traffic judging units J1 to J4 at the same time, or a judgment on the abnormal traffic may be made by the abnormal traffic judging units J1 to J4 in turns.

Next, the calculation amount when the amount of traffics is calculated in the abnormal traffic detection system 200 according to the present embodiment and the calculation amount when the amount of traffics is calculated in a conventional communication system will be described. In the following, a difference between the calculation amounts will be described by comparing the calculation amount when the abnormal traffic detection system 200 comprises four ISPs and the conventional calculation amount.

Figure 17:
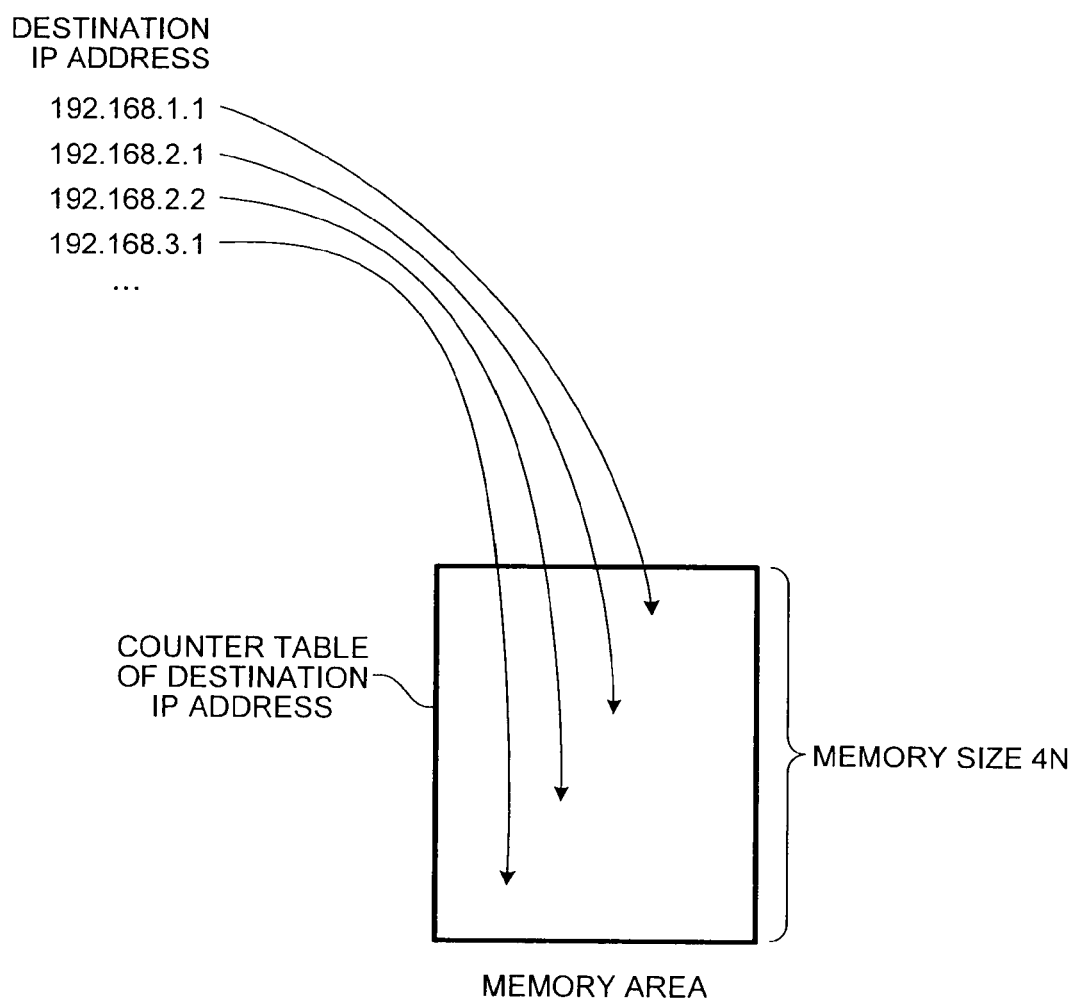
FIG. 17 is a diagram explaining the calculation amount when the amount of traffics is calculated using a conventional communication system.

FIG. 16 is a diagram explaining the calculation amount when the amount of traffics is calculated using the abnormal traffic detection system. FIG. 17 is a diagram explaining the calculation amount when the amount of traffics is calculated using a conventional communication system.

In the abnormal traffic detection system 200 according to the present embodiment, a memory having a size of N, which is predetermined for holding a counter table, is saved in the destination IP address counting units C1 to C4, respectively. Then, the counter tables 101 to 104 are arranged on the saved memories, respectively. In other words, in the abnormal traffic detection system 200, the memory area saved within the abnormal traffic analyzing unit 20 is divided into four as many as the number of the ISPs and each memory area stores each of the counter tables 101 to 104 therein. Then, a list with the destination IP address as an index is stored in the memories (the counter tables 101 to 104) provided in the destination IP address counting units C1 to C4, respectively.

Though each of the counter tables 101 to 104 holds an index and its counter value, there will be described a case in which the calculation amounts for index retrieval are compared as one example of calculating the traffic amount. Thus, in the following description, the calculation amount for index retrieval is calculated for the memory area holding the index, and the calculation amount for the memory area storing the counter value therein is not considered.

As illustrated in FIG. 16, in the abnormal traffic detection system 200, when the layer 2 switch 11 transmits the sFlow packet containing a predetermined destination IP address, the traffic separating unit 21 judges the counter table to be retrieved, at first. An expected value of the number of times for comparison (the number of times of calculation) of the destination IP addresses, which is necessary for judging the counter table to be retrieved, is 2. Therefore, when m (m is a natural number) samples of the IP packet have been received, the expected value of the number of times of comparison is 2 m.

After judging the counter table to be retrieved, the traffic separating unit 21 retrieves the destination IP address from the memory (index) having the size of N. In this case, when the destination IP address is retrieved by a linear search, the expected value of the number of times for comparison is N/2. From the above, the expected value of the number of times of comparison when m samples of the IP packet have been received is 2 m+Nm/2.

As illustrated in FIG. 17, since the conventional communication system does not have a traffic separating unit, one counter table is arranged in a previously-saved memory. In the conventional communication system, when the layer 2 switch 11 receives the sFlow packet containing a predetermined destination IP address, the destination IP address is retrieved from the index having the size of 4N.

Since the type of the destination IP address to be observed does not depend on the presence of the traffic separating unit 21, the memory area having a total memory size of 4N is saved within the communication system (apparatus for analyzing an abnormal traffic). In this case, when the destination IP address is retrieved by the linear search, the expected value of the number of times for comparison is 2N. Thus, when m samples of the IP packet have been received, the expected value of the number of times of comparison is 2 Nm.

When the number of ISPs connected to the layer 2 switch 11 is assumed as p (p is a natural number), the comparison process is required (pNm/2) times in the conventional communication system (communication system having no traffic separating unit 21). On the other hand, in the abnormal traffic detection system 200 according to the present embodiment, the number of times for the comparison process is ((p+N)m/2). Thus, as the value of p and the value of N increase, a load is accordingly reduced when the abnormal traffic detection system 200 calculates the amount of traffics. From the above, a load for calculating the amount of traffics is more reduced when the amount of traffics is calculated by the abnormal traffic detection system 200 than the amount of traffics is calculated by the conventional communication system.

It has been described in the present embodiment the case in which the abnormal traffic detection system 200 comprises one layer 2 switch 11, but a plural of the layer 2 switches 11 may be arranged in the abnormal traffic detection system 200 depending on the scale of the IX.

It has been described in the present embodiment the case in which the abnormal traffic detection system 200 comprises four ISPs 1 to 4, but the abnormal traffic detection system 200 may include three or less ISPs, or five or more ISPs.

It has been described in the present embodiment the case in which the layer 2 switch 11 is connected with the ISPs 1 to 4, but the layer 2 switch 11 may be connected to other communication apparatus such as an IDC (Internet data center) or a personal computer.

Though the sFlow packet is used to detect an abnormal traffic in the present embodiment, a packet other than the sFlow packet may be used to detect an abnormal traffic, if the sFlow packet contains information on the traffics flowing through the layer 2 switch 11.

It has been described in the present embodiment the case in which the abnormal traffic analyzing unit 20 has the abnormal traffic judging units J1 to J4 as many as the destination IP address counting units C1 to C4, but three or less abnormal traffic judging units may be employed. In this case, one abnormal traffic judging unit detects an abnormal traffic for plural destination IP address counting units.

It has been described in the present embodiment the case in which the traffic information transmitting unit 30 of the abnormal traffic detection apparatus 100 monitors the traffics flowing through the layer 2 switch 11 and transmits the sFlow packet to the abnormal traffic analyzing unit 20, but the layer 2 switch 11 may directly transmit the sFlow packet to the abnormal traffic analyzing unit 20. In this case, the abnormal traffic detection apparatus 100 does not need to comprise the traffic information transmitting unit 30. Further, in this case, the layer 2 switch 11 and the abnormal traffic analyzing unit 20 are connected to each other.

According to the first embodiment as described above, the "destination MAC address" and the "destination VLAN" are associated with the "destination IP address" in the sFlow packet and the "destination MAC address" and the "destination VLAN" are associated with the ISP in the IX management information. Thus, the ISP which is to be routed at first to reach the destination IP address can be easily identified.

Furthermore, since the traffics are separated and counted for each ISP to be routed, the ISP where an abnormal traffic has occurred can be easily identified. Thus, it is possible to easily notify the ISP where the abnormal traffic has occurred of the fact that the abnormal traffic has occurred.

Furthermore, since a distribution measurement (counting) of the destination IP addresses is performed after the traffics are separated corresponding ISP to be routed, the distribution range (storage area) of the destination IP addresses (traffics) to be stored becomes narrower. Thereby, since the number of indexes to be retrieved is reduced, a processing load for performing the destination IP address retrieval process is more reduced than the conventional retrieval method. Thus, abnormal traffics can be efficiently and rapidly detected in a simple structure.

Second Embodiment

The embodiment of the invention has been described above but the invention may be embodied in various different forms other than the aforementioned embodiment. A different embodiment will be described below in terms of (1) system configuration and others, and (2) program.

(1) System Configuration and Others

Each element in each apparatus illustrated in the figures is functionally conceptual and does not necessarily be configured physically the same as indicated in the figures. In other words, specific forms of distribution and integration of the respective apparatuses are not limited to illustrated ones and all or part of them may be configured in a functionally or physically distributed or integrated manner in arbitrary unit depending on various loads or usage. Further, all or part of each processing function performed in each apparatus can be obtained in a CPU and a program, which is analyzed and executed in the CPU, or can be obtained in a hardware, which is formed by using wired logic. Furthermore, the abnormal traffic detection apparatus 100 described in the first embodiment can be integrated in the layer 2 switch 11.

(2) Program

The abnormal traffic detection method described in the first embodiment can be performed by executing a previously-prepared program in a computer such as personal computer or work station. The program can be distributed via a network such as Internet. Further, the program can be recorded in a computer readable recording medium such as hard disk, flexible disk (FD), CD-ROM, MO and DVD and can be read out from the recording medium by the computer for execution.

INDUSTRIAL APPLICABILITY

As described above, the abnormal traffic detection apparatus, the abnormal traffic detection method, and the abnormal traffic detection program according to the present invention are suitable for detecting an abnormal traffic at an IX.

The invention claimed is:

1. An abnormal traffic detection apparatus that, when traffics are transmitted and received between a plurality of ISPs (Internet Service Providers) connected to the Internet via a switch, monitors traffics passing through the switch and uses traffic information on the monitored traffics to detect abnormal traffics toward the ISPs, comprising:

an amount information storing unit configured to store amount information on an amount of traffics as an amount information table, the amount information table corresponding to each ISP that is a destination of the traffics, the amount information being included in the traffic information;

a storage controlling unit configured to identify the ISP which is a destination of the traffics on the basis of one or more destination IP addresses of the traffic information, the storage controlling unit configured to, when a destination IP address identified by the traffic information is already stored in the amount information table corresponding to the identified ISP, store the identified IP address and the amount information in the amount information table corresponding to the identified ISP, and the storage controlling unit configured to, when a destination IP address identified by the traffic information is not stored in the amount information table corresponding to the identified ISP, store the amount information in the amount information table corresponding to the identified ISP; and an abnormal traffic judging unit that judges, for each of the ISPs, whether the traffic amount flowing through the switch is abnormal on the basis of the amount information stored in the amount information table.

2. The abnormal traffic detection apparatus according to claim 1, wherein the storage controlling unit is configured to identify the ISP as the destination of the traffics on the basis of a destination MAC (Media Access Control) address and a destination VLAN (Virtual Local Area Network), both of which are included in the traffic information, and previously-stored information on a ISP corresponding to the destination MAC address and the destination VLAN.

3. The abnormal traffic detection apparatus according to claim 1, wherein the judging unit is configured to store threshold values, which are used in judging whether the traffic amount is abnormal, for the respective amount information tables, and is configured to compare, for each of the amount information tables, the amount information stored in the amount information table and the threshold value corresponding to the amount information in order to judge whether the traffic amount flowing through the switch is abnormal.

4. An abnormal traffic detection method that, when traffics are transmitted and received between a plurality of ISPs (Internet Service Providers) connected to the Internet via a switch, monitors traffics passing through the switch and uses traffic information on the monitored traffics to detect abnormal traffics toward the ISPs, the method comprising:

a traffic information acquiring step of acquiring the traffic information;

a destination identifying step of identifying the ISP which is a destination of the traffics on the basis one or more destination IP addresses of the traffic information;

an amount information storing step of storing when a destination IP address identified by the traffic information is already stored in an amount information table corresponding to the identified ISP, the identified IP address and the amount information in the amount information table corresponding to the identified ISP, and when a destination IP address identified by the traffic information is not stored in the amount information table corresponding to the identified ISP, storing the amount information in the amount information table corresponding to the identified ISP, the amount information being included in the traffic information; and an abnormal traffic judging step of judging, for each of the ISPs or each of the routers, whether the traffic amount flowing through the switch is abnormal on the basis of the amount information stored in the amount information table.

5. The abnormal traffic detection method according to claim 4, wherein the amount information storing step includes identifying the ISP as the destination of the traffics on the basis of a destination MAC address and a destination VLAN, both of which are included in the traffic information, and previously-stored information on a ISP corresponding to the destination MAC address and the destination VLAN.

6. The abnormal traffic detection method according to claim 4, wherein the abnormal traffic judging step includes storing threshold values, which are used in judging whether the traffic amount is abnormal, for the respective amount information tables, and comparing, for each of the amount information tables, the amount information stored in the amount information table and the threshold value corresponding to the amount information in order to judge whether the traffic amount flowing through the switch is abnormal.

7. A non-transitory computer readable storage medium that stores an abnormal traffic detection program that uses traffic information on traffics, which are monitored when transmitted and received passing through a switch between a plurality of ISPs (Internet Service Providers) connected to the Internet via the switch, to cause a computer to detect abnormal traffics toward the ISP, comprising:

a traffic information acquiring step of acquiring the traffic information;

a destination identifying step of identifying an ISP which is a destination of the traffics on the basis of one or more destination IP addresses of the traffic information;

an amount information storing step of storing when a destination IP address identified by the traffic information is already stored in an amount information table corresponding to the identified ISP, the identified IP address and the amount information in the amount information table corresponding to the identified ISP, and when a destination IP address identified by the traffic information is not stored in the amount information table corresponding to the identified ISP, storing the amount information in the amount information table corresponding to the identified ISP, the amount information being included in the traffic information; and an abnormal traffic judging step of judging, for each of the ISPs, whether the traffic amount flowing through the switch is abnormal on the basis of the amount information stored in the amount information table.

8. The non-transitory computer readable storage medium according to claim 7, wherein the amount information storing step includes identifying the ISP as the destination of the traffics on the basis of a destination MAC address and a destination VLAN, both of which are included in the traffic information, and previously-stored information on a ISP corresponding to the destination MAC address and the destination VLAN.

9. The non-transitory computer readable storage medium according to claim 7, wherein the abnormal traffic judging step includes storing threshold values, which are used in judging whether the traffic amount is abnormal, for the respective amount information tables, and comparing, for each of the amount information tables, the amount information stored in the amount information table and the threshold value corresponding to the amount information in order to judge whether the traffic amount flowing through the switch is abnormal.

10. The abnormal traffic detection method according to claim 4, further comprising a notifying step of notifying one of the ISPs that there is abnormal traffic when the traffic amount flowing through the switch is abnormal on the basis of the amount information stored in the amount information table corresponding to the ISP.

* * * * *